D. B. ADAMS.
VEHICLE SPRING WITH AIR CUSHION.
APPLICATION FILED MAY 19, 1913.
1,140,095.
Patented May 18, 1915.
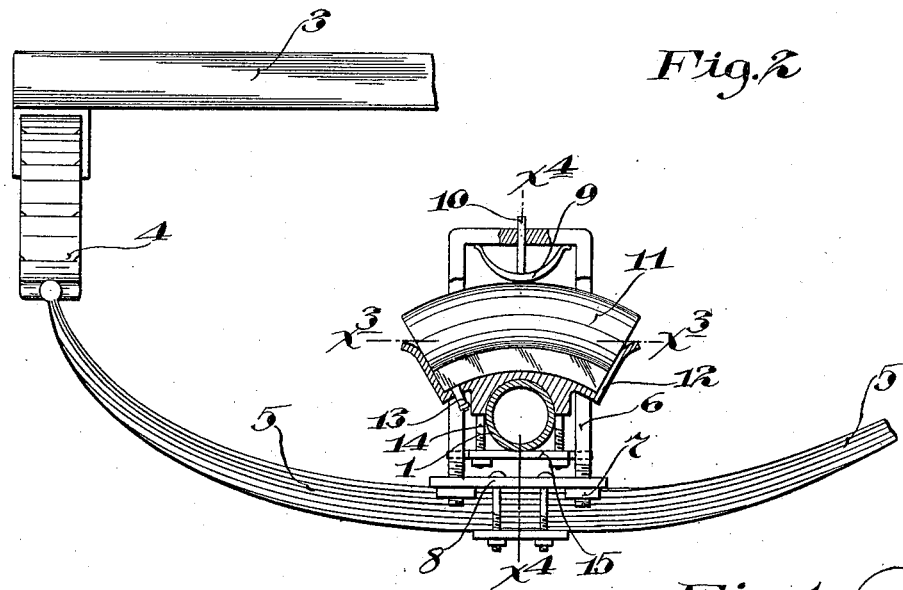
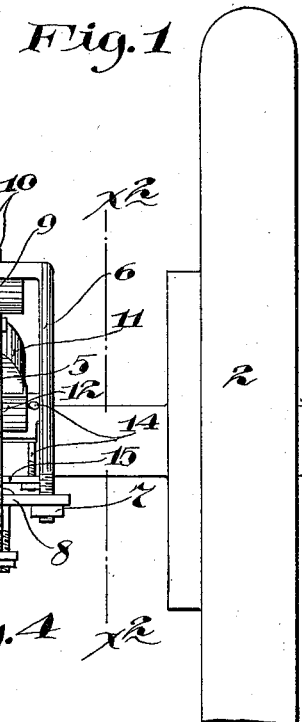
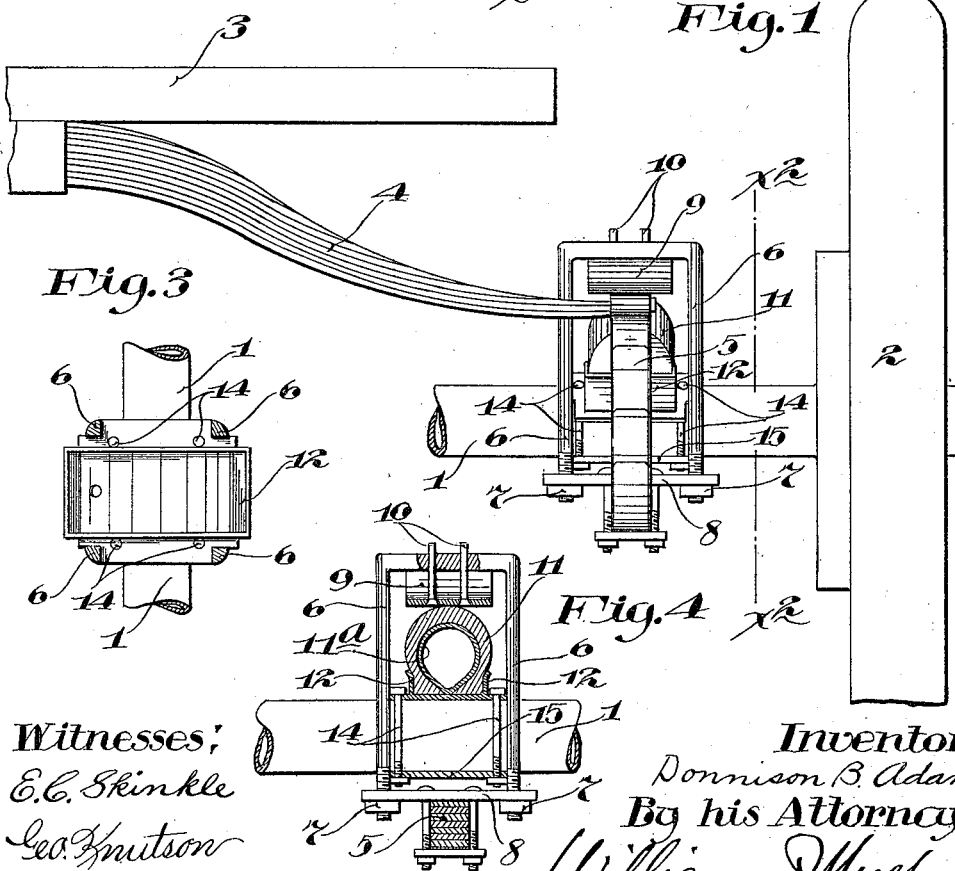
Witnesses:
E. C. Skinkle
Geo. Knutson
Inventor:
Donnison B. Adams
By his Attorneys:
Williamson Muckart

UNITED STATES PATENT OFFICE.

DONNISON B. ADAMS, OF MINNEAPOLIS, MINNESOTA, ASSIGNOR OF ONE-HALF TO EDWARD B. DOUGLAS, OF MINNEAPOLIS, MINNESOTA.

VEHICLE-SPRING WITH AIR-CUSHION.

1,140,095.  Specification of Letters Patent.  Patented May 18, 1915.

Application filed May 19, 1913. Serial No. 768,541.

*To all whom it may concern:*

Be it known that I, DONNISON B. ADAMS, a citizen of the United States, residing at Minneapolis, in the county of Hennepin and State of Minnesota, have invented certain new and useful Improvements in Vehicle-Springs with Air-Cushions; and I do hereby declare the following to be a full, clear, and exact description of the invention, such as will enable others skilled in the art to which it appertains to make and use the same.

My invention has for its object to provide an improved vehicle spring having an auxiliary pneumatic attachment or element adapting it to absorb all of the various different kinds of shocks encountered in automobile or similar service.

It is well known that a pneumatic tire is especially efficient in absorbing shocks produced by small obstructions, such as stones and rocks, and that ordinary springs are efficient to take up the shocks due to depressions, and the like, in the roadbeds which produce slower and greater movements of the spring-supported vehicle body.

My invention consists in so combining springs and pneumatic cushions that the spring device provided will, as indicated, efficiently take care of all of the various different kinds and degrees of vibrations or shocks, thus making it feasible to use solid rim tires on the wheels.

In the accompanying drawings which illustrate the invention, like characters indicate like parts throughout the several views.

Referring to the drawings, Figure 1 is a fragmentary view in rear elevation showing a portion of an automobile and one of my improved spring devices applied thereto; Fig. 2 is a fragmentary view in section on the line $x^2$ $x^2$ on Fig. 1; Fig. 3 is a horizontal section taken on the line $x^3$ $x^3$ on Fig. 2, some parts being removed; and Fig. 4 is a vertical section with some parts sectioned on the line $x^4$ $x^4$ on Fig. 2, and with some parts shown in full.

Of the parts of the automobile, in so far as they are shown in the drawings, the numeral 1 indicates the rear axle, the numeral 2 one of the rear wheels, the numeral 3 portions of the vehicle body, the numeral 4 the rear platform spring, and the numeral 5 one of the half elliptical side springs. The springs 4 and 5 are connected in the usual way, and the spring 4 is connected to the vehicle body 3 in the customary way. Usually the spring 5 would be rigidly secured at its center to the rear axle 1, but in applying my invention, a very different connection is made, and which connection will now be described.

The numeral 6 indicates a four-legged stirrup, the lower ends of the prongs of which are adjustably secured by nuts 7 to an anchor plate 8, which, in turn, is rigidly bolted to the central portion of the side spring 5. The stirrup 6 has a flat plate-like top against which is seated an approximately semi-cylindrical abutment 9, which is preferably in the form of a spring and is provided with stems 10 working loosely through the top of said stirrup. The abutment 9 rests directly upon a short pneumatic tube 11 which is preferably of segmental form, and is seated in a saddle bracket 12 which, in turn, is usually bolted, or otherwise secured to the axle 1. Preferably the pneumatic tube 11 has an inner tube $11^a$ provided with a charging nipple 13, which, as shown, projects through the bottom of the saddle 12. When the pneumatic tube 11—$11^a$ is inflated, it affords a yielding element between the axle 1 and spring 5. The weight of the load is, of course, transmitted from the spring 5, through the stirrup 6 to the curved abutment 9, and by the latter is applied to the pneumatic tube at a point directly over the axle. In this construction, shocks, such as produced by stones and small obstructions, will be transmitted through the wheel and axle to the pneumatic cushion afforded by the tube 11, and by the latter, will be nearly or quite absorbed without relying upon resilience of the springs 4 and 5 to any considerable extent. Otherwise stated, the pneumatic cushion or air tube in this association with the springs, is thought to make a vehicle as easy riding, with wheels having solid tires, as is an ordinary vehicle with pneumatic tires. This pneumatic auxiliary cushion, of course, has an advantage over a pneumatic tire, in that it is of much less cost, and cannot be punctured, and is not heated by tractional friction. The form of the tube and of the so-called stirrup and of the abutment 9 may, of course, be materially changed. For example, the said abutment, when made of spring material, gives a somewhat increased resilience, but otherwise, would work as well if solid. The prongs or legs of the stirrup 6 (see particular Fig. 3), engage corner notches of the saddle bracket 12. As shown, the said saddle bracket 12 is rigidly connected to the axle 1 by nut-equipped studs 14 and a coöperating clamping plate 15, which latter is also provided with corner notches that work with sliding engagement on the four legs of the stirrup 6.

What I claim is:

1. In a vehicle, the combination with an axle and a body, spring-supported therefrom, of a saddle bracket secured on said axle, a pneumatic tube supported by said saddle bracket, a spring supporting said body, provided with a stirrup embracing said pneumatic tube, and an auxiliary spring interposed between said stirrup and pneumatic tube.

2. In a vehicle, the combination with an axle and a body, spring-supported therefrom, of a saddle bracket secured on said axle, an elongated pneumatic tube supported by said saddle bracket, a spring supporting said body, provided with a stirrup embracing said pneumatic tube, and a semi-elliptical spring carried by said stirrup, with its intermediate portion bearing on said pneumatic tube.

In testimony whereof I affix my signature in presence of two witnesses.

DONNISON B. ADAMS.

Witnesses:
HARRY D. KILGORE,
F. D. MERCHANT.

Copies of this patent may be obtained for five cents each, by addressing the "Commissioner of Patents, Washington, D. C."